July 3, 1962  F. R. BONHOMME  3,042,895
INTERLOCKED ELECTRICAL CONNECTORS
Filed March 22, 1960
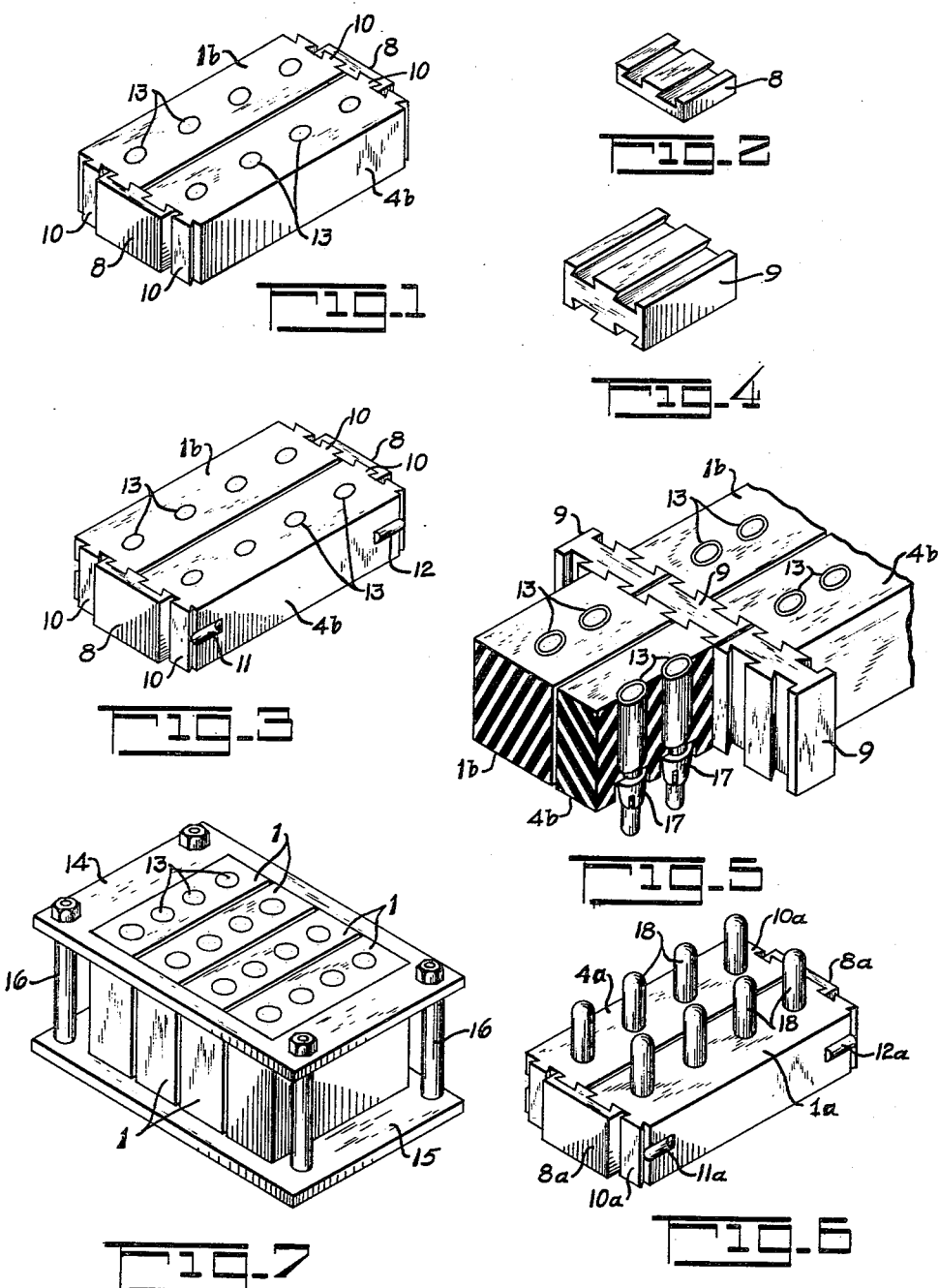
INVENTOR.
FRANCOIS ROBERT BONHOMME
BY
his ATTORNEY 3,042,895
Patented July 3, 1962

3,042,895
INTERLOCKED ELECTRICAL CONNECTORS
François Robert Bonhomme, Courbevoie, Seine, France, assignor to Curtiss-Wright Corporation, a corporation of Delaware
Filed Mar. 22, 1960, Ser. No. 16,859
Claims priority, application France March 23, 1959
2 Claims. (Cl. 339—176)

The present invention relates to separable electrical connection devices comprising a pair of plates having a generally parallelepipedal shape, preferably of insulating material, each of which is provided on the same face with one or a number of conductive plugs mounted on one plate and an equal number of conductive sockets mounted on the other.

The present invention has for its object to permit of the assembly of any desired number of these electrical devices.

The electrical connection device in accordance with the invention is characterized by the fact that each of its two plates comprises, on two opposite lateral faces, interlocking surfaces adapted to engage and co-operate with interlocking surfaces having corresponding shapes (that is to say having substantially the same configuration as the preceding surfaces, but hollow instead of raised and vice versa). The plugs and sockets may be arranged in such manner as to admit of a small radial displacement with respect to each other with a view to the assembly, on the one hand, of two plates provided with plugs and, on the other hand, of two plates provided with sockets belonging to two similar connection devices.

In accordance with the invention, the interlocking surfaces provided on two opposite faces of a same plate have identical shapes, so that on the one hand, the plug-plates and on the other hand, the socket-plates of two similar connection devices can be assembled by engaging substantially one half of their interlocking surfaces with the corresponding surfaces of a coupling member having a shape which is adapted to correspond to that of the assembly of the two juxtaposed halves of the interlocking surfaces of the said plates. The coupling member can have interlocking surfaces either on one of its faces only, with the object of assembling together two juxtaposed plates only, or on two opposite faces, with the object of assembling four juxtaposed plates.

The plates can be of a rigid material, the interlocking surfaces being in that case prismatic, thereby permitting each surface to be engaged inside the other by sliding in a direction parallel to their generator lines. The plates can also be of elastic material, the interlocking surfaces being in that case of the closed contour type, thus permitting the interlocking surfaces to engage one inside the other by elastic deformation.

The present invention will in any case be more clearly understood by means of the complementary description which follows below, together with the accompanying drawing, it being clearly understood that both complementary description and drawing are given by way of example only and not in any sense by way of implied limitation.

In order to simplify the figures, only the socket-plates of the connection devices in certain instances have been illustrated, since the corresponding plug-plates are arranged in like manner.

FIG. 1 shows in perspective two juxtaposed socket-plates constructed in accordance with the invention and adapted to co-operate with the coupling member also shown in perspective in FIG. 2.

FIG. 3 shows the plates of FIG. 1, after assembly by means of the coupling member of FIG. 2.

FIGS. 4 and 5 show, similarly to FIGS. 2 and 3, a coupling member and socket-plates, partly in section, constructed in accordance with an alternative form of said figures, and FIG. 6 shows plug-plates of the type adapted to cooperate with the socket-plates of FIGS. 1 and 3.

Finally, FIG. 7 shows socket-plates of the type above shown after mounting in a rigid framework.

In practicing the invention, socket plates are provided, each having four sockets, for example. Each plate has at its opposite sides, or ends, a tenon and mortice configuration, for a purpose presently described. The ridges of the tenon and mortice arrangement are parallel to the axes of the sockets.

The corresponding plug-plates are arranged in the same manner. To make it possible for the plugs of said plates to be inserted in the corresponding sockets of the socket-plates in spite of the lack of precision which may possibly exist in the dimensions of the plug and socket-plates, the plugs and sockets may be arranged in such manner that they admit of a small radial displacement with respect to each other. To this end, there can be employed sockets constructed in accordance with the indications given in the patent application filed in the U.S.A. on February 24, 1959, under No. 795,031, now abandoned. It is known that these sockets are provided in the interior with a certain number of contact wires which are applied against the plug and are deformed elastically when this latter is driven into the socket, each contact wire being stretched between two points coupled together in unvarying manner and the complete set of said wires being arranged along the generator lines of one of the two families of generatrices of a hyperboloid of revolution.

FIG. 1 shows two identical socket-plates 1*b* and 4*b* provided with sockets 13, on which plates there are formed, on the two opposite faces, tenons 10 arranged identically on the two faces to make a tenon-mortice configuration. Coupling members 8 (FIG. 2) co-operate with said plates 1*b* and 4*b*, and on one face of each coupling member there is also formed a tenon-mortice structure having a shape corresponding to the configuration of the assembly of the two adjacent and juxtaposed halves of the members 1*b* and 4*b*, indicated by the bracketed portion in FIG. 1. The coupling members or fasteners 8 are preferably formed by moulding of insulating material or metallic material. By sliding the fasteners 8 along the tenons 10, the two plates 1*b* and 4*b* are assembled together as shown in FIG. 3. In order to facilitate the mutual positioning of the two plates 1*b* and 4*b*, it is an advantage to provide the faces of the plates such as 1*b* and 4*b*, which are intended to come into mutual contact, with hollow portions 11 (FIG. 3) and projections 12 arranged for interlocking engagement.

FIG. 4 shows a coupling member 9 provided with mortices, not merely on one of its faces as in the case of the member 8 of FIG. 2, but on two of its faces. A member of this type makes it possible for socket-plates such as those shown at 1*b* and 4*b* in FIG. 1 to be assembled together in units of four in the manner disclosed by FIG. 5.

The operative relationship of the co-acting socket and plug connections is best illustrated by FIGS. 5 and 6. In FIG. 5, the sectional view illustrates a pair of sockets 13 having terminals 17. The sockets are suitably moulded in the insulating plates 1*b* and 4*b*. The insulating material (as, for example, "Rilsan") forming the plates 1*b* and 4*b*, and the coupling members, preferably has a certain elasticity so that limited elastic deformation is possible during fitting and mounting of the plates, etc.

In FIG. 6, the connector plugs 18 are mounted in a similar manner in the insulating plug plates 1*a* and 4*a* so as to be in alignment with the corresponding sockets 13 of FIG. 3. Similar couplings 8 and plate alignment means 11*a* and 12*a* are used also in the manner of FIG. 3.

When a certain number of plug or socket-plates has been assembled together in the manner described above, they can be mounted as in FIG. 7 in a rigid framework constituted for example by two metallic or insulating plates 14 and 15 which are coupled to each other by screws 16, while one of the plates can be employed to fix the complete unit to the framework of the apparatus in which it is used.

As will be readily understood, and as the foregoing description has furthermore made apparent, the present invention is in no way limited either to those methods of application or to those forms of construction of its various parts which have been more particularly contemplated, but is intended to cover, on the contrary, all its alternative forms.

What I claim is:

1. A separable electrical connection device which comprises in combination at least two socket plates of general parallelepipedal shape, a first one and a second one, and at least two plug plates of corresponding parallelepipedal shape, a first one and a second one, each of said socket plate being provided with a plurality of sockets normal to one of the faces thereof, a plurality of plugs carried by each of said plug plates and normal to one of the faces thereof, said two socket plates adjoining each other, said two plug plates adjoining each other, said two socket plates having respective faces parallel to the longitudinal axes of said sockets located in alinement with each other, said two alined faces being provided with grooves and tongues, a coupling plate provided with tongues and grooves adapted to cooperate with said grooves and tongues of the corresponding socket plates respectively by sliding engagement, said two plug plates having respective faces parallel to the longitudinal axes of said plugs located in alinement with each other, said two last-mentioned alined faces being provided with grooves and tongues, and a coupling plate provided with tongues and grooves adapted to cooperate by sliding engagement with said grooves and tongues of the corresponding plug plates respectively.

2. A device according to claim 1 wherein each of said coupling plates is provided with tongues and grooves on both sides thereof, for engagement with two other socket plates for the first of said coupling plates, and for engagement with two other plug plates for the second of said coupling plates.

References Cited in the file of this patent

UNITED STATES PATENTS

| | | |
|---|---|---|
| 2,463,826 | Thacker | Mar. 8, 1949 |
| 2,469,397 | Mezek | May 10, 1949 |
| 2,780,791 | Morschel | Feb. 5, 1957 |
| 2,892,176 | Gordon | June 23, 1959 |

FOREIGN PATENTS

| | | |
|---|---|---|
| 66,587 | Switzerland | Sept. 13, 1913 |
| 815,293 | Great Britain | June 24, 1959 |